United States Patent
He et al.

(10) Patent No.: US 12,225,117 B2
(45) Date of Patent: Feb. 11, 2025

(54) SYSTEMS AND METHODS FOR DEVICE GROUPING BASED ON QUANTUM RESISTANT ENCRYPTION CAPABILITY

(71) Applicant: Verizon Patent and Licensing Inc.

(72) Inventors: Dayong He, Bridgewater, NJ (US); Manuel Enrique Caceres, Basking Ridge, NJ (US); Mun Wei Low, Irving, TX (US); Warren Hojilla Uy, Randolph, NJ (US); John M. Stokes, Yorba Linda, CA (US); Young Rak Choi, Belle Mead, NJ (US); Feng Luo, Livingston, NJ (US); Babila Sunny Pinyin, Somerset, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 293 days.

(21) Appl. No.: 17/667,708

(22) Filed: Feb. 9, 2022

(65) Prior Publication Data
US 2023/0254133 A1 Aug. 10, 2023

(51) Int. Cl.
*H04L 9/08* (2006.01)
*G06N 10/80* (2022.01)
*H04L 9/40* (2022.01)

(52) U.S. Cl.
CPC .......... *H04L 9/0855* (2013.01); *G06N 10/80* (2022.01); *H04L 63/0281* (2013.01); *H04L 63/0428* (2013.01)

(58) Field of Classification Search
CPC ............... H04L 9/0855; H04L 63/0281; H04L 63/0428; H04L 9/0852; H04L 63/18; G06N 10/80
See application file for complete search history.

(56) References Cited

U.S. PATENT DOCUMENTS

| | | | |
|---|---|---|---|
| 10,574,446 B2* | 2/2020 | Fu | H04L 9/0852 |
| 11,223,470 B1* | 1/2022 | Shea | G06F 21/64 |
| 2016/0149700 A1* | 5/2016 | Fu | H04L 9/0858 380/278 |
| 2018/0109377 A1* | 4/2018 | Fu | H04L 63/0823 |
| 2019/0116035 A1* | 4/2019 | Mustafa | H04L 9/14 |

(Continued)

OTHER PUBLICATIONS

Mailloux et al., "Post-Quantum Cryptography What Advancements in Quantum Computing Mean for IT Professionals", Sep. 2016, IT Professional, vol. 18, No. 5, pp. 42-47 (Year: 2016).*

*Primary Examiner* — Kenneth W Chang

(57) ABSTRACT

One or more computing devices, systems, and/or methods are provided. In an example, a system includes a first non-quantum-resistant (NQR) device configured to generate first data and a first quantum capable proxy server configured to receive the first data, encrypt the first data using a quantum resistant (QR) protocol to generate first QR data, and communicate the first QR data to a first target device using a first QR channel. In an example, a method includes generating first data by a first non-quantum-resistant (NQR) device, communicating the first data, by the first NQR device, to a first quantum capable proxy server, encrypting the first data, by the quantum capable proxy server, using a quantum resistant (QR) protocol to generate first QR data, and communicating, by the quantum capable proxy server, the first QR data to a first target device using a first QR channel.

19 Claims, 14 Drawing Sheets

(56) References Cited

U.S. PATENT DOCUMENTS

| | | | |
|---|---|---|---|
| 2019/0319796 A1* | 10/2019 | Ghosh | H04L 9/0852 |
| 2019/0319804 A1* | 10/2019 | Mathew | G09C 1/00 |
| 2020/0280436 A1* | 9/2020 | Nix | H04L 9/0869 |
| 2021/0281404 A1* | 9/2021 | Kampanakis | H04L 63/205 |
| 2022/0182413 A1* | 6/2022 | Benson | H04L 9/14 |
| 2022/0345298 A1* | 10/2022 | Cap | H04L 9/0869 |
| 2023/0119304 A1* | 4/2023 | Nagaratnam | H04L 9/0855 |
| | | | 380/255 |

* cited by examiner

| WHAT | WHERE | WHO | WHEN | HOW | RISK LEVEL | ALLOW/DENY |
|---|---|---|---|---|---|---|
| FILE | LOW RISK ZONE | OUTSIDE ENCRYPTION PROCESS | 2:00 AM ET | ENCRYPT FILES WITH KEY NOT FROM ENCRYPTION ENGINE | HIGH | DENY |
| CLI | MEDIUM RISK ZONE | GENERAL USER | 8:00 PM ET | SUDO (IDENTITY CHANGE SERVICE) | HIGH | DENY |
| CAMERA | LOW RISK ZONE | SECURE SHELL (SSH) AGENT | 9:00 AM ET | CONNECT TO ROGUE IP | HIGH | DENY |
| BROWSER APP | LOW RISK ZONE | GENERAL USER | 2:00 PM ET | OPEN LEGITIMATE URL | LOW | ALLOW |

Fig. 4

SYSTEMS AND METHODS FOR DEVICE GROUPING BASED ON QUANTUM RESISTANT ENCRYPTION CAPABILITY

BACKGROUND

Various applications may provide services. The applications may be required to meet security requirements, such as by controlling access to protected resources, performing encrypted communication with clients, managing certificates, etc. However, an application may have to integrate with multiple infrastructure components (e.g., security infrastructure components) to meet such security requirements, which may be a difficult and/or complex task.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 4 is a diagram illustrating a rule table, in accordance with some embodiments.

DETAILED DESCRIPTION OF EXAMPLE EMBODIMENTS

Figure 1:
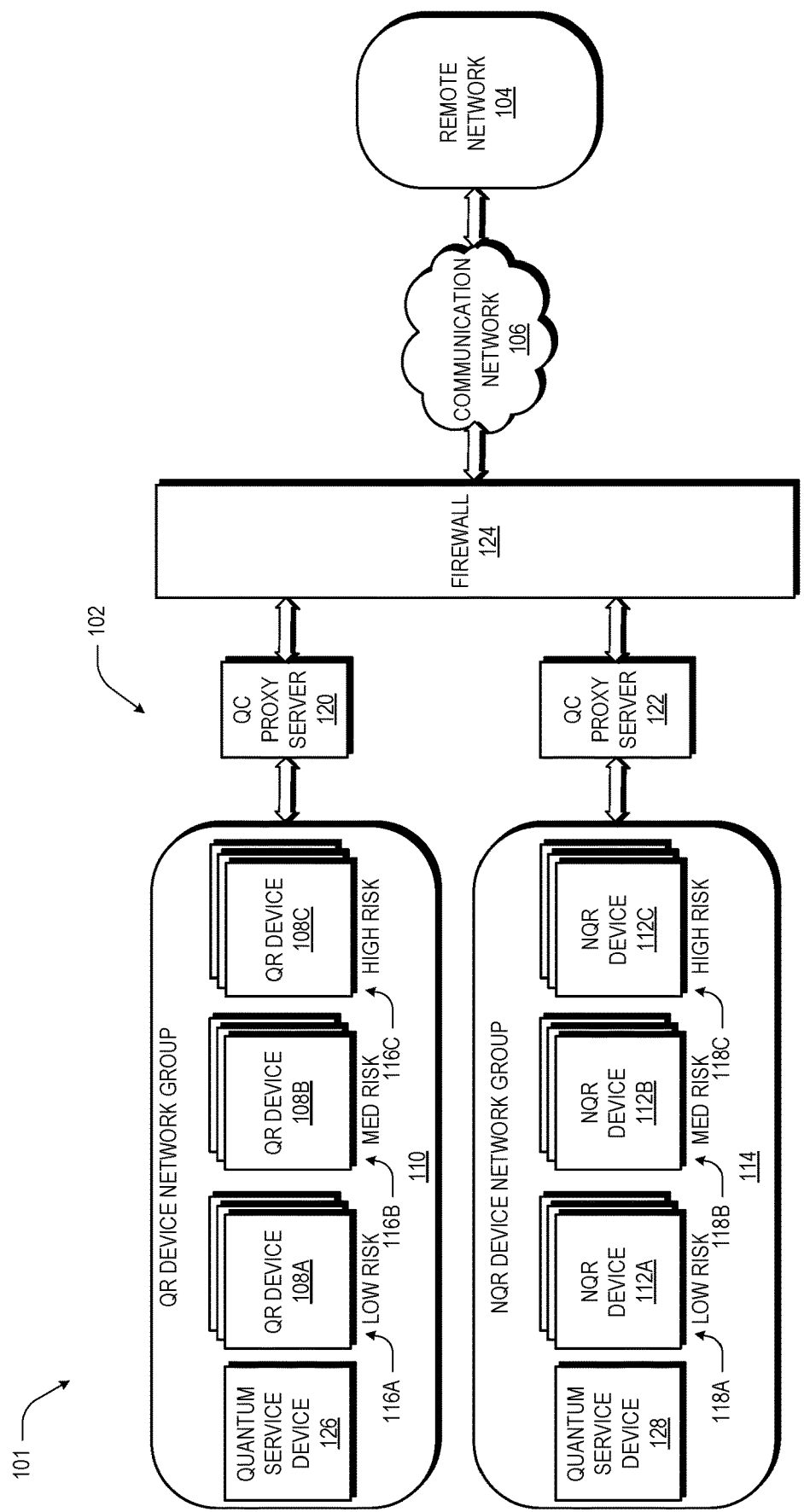
FIG. 1 is a diagram illustrating an example system implementing device grouping based on quantum resistant encryption capability, in accordance with some embodiments.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of scenarios in which the disclosed subject matter may be utilized and/or implemented. Quantum computing poses risks to security of network, data, and privacy. A quantum capable device may break the encryption provided by most current cryptography techniques, such as Rivest-Shamir-Adelman (RSA), digital signature algorithm (DSA), elliptic curve digital signature algorithm (ECDSH), or other asymmetric techniques, making data and transactions vulnerable. After the implementation of quantum-resistant cryptography techniques and quantum-resistant networking protocols, some devices may not be able to use these quantum-resistant technologies due to limitations of the device or implementation cost factors. Quantum-resistant and non-quantum-resistant devices and networks will likely co-exist.

One or more systems and/or techniques for implementing device grouping based on quantum resistant encryption capability are provided. For example, devices may execute applications that are required to meet security requirements, such as by at least one of controlling access to protected resources, performing encrypted communication with other devices, managing certificates, etc.

Quantum resistant encryption techniques include post-quantum cryptography (PQC) and quantum key distribution (QKD). A PQC algorithm uses a mathematical encryption technique that is believed to remain safe even in the presence of quantum computers. A QKD algorithm generates and distributes a random key using quantum techniques, such as quantum superposition or quantum entanglement, and the random key is used with an encryption technique such as a one-time pad (OTP) technique or a symmetric key algorithm. Certain devices, referred to as quantum-resistant (QR) devices are capable of using a quantum based approach, such as PQC, QKD, or some other quantum based algorithms, and other devices, referred to as non-quantum-resistant (NQR) devices do not have the ability to use a quantum based approach, such as due to hardware limitation, or processing limitations, or some other limitations.

Accordingly, as provided herein, QR devices and NQR devices are segregated into groups within a first network, such as a local network. The local network may be a traditional local area network (LAN), a virtual local area network (VLAN), a wireless local network (WLAN), a subnet, a network with micro segmentation, a combination of these networks, or some other suitable local network. Separate quantum capable (QC) proxy servers are associated with the QR devices and the NQR devices to facilitate secure quantum communication between the devices in the first network and between devices in the first network and remote devices in a second network remote from the first network that connect to the first network, such as through the Internet. The QC proxy servers negotiate encryption protocols for use with the remote device or the second network depending on the capabilities of the remote device or second network. A quantum service device within a QR device group or a NQR device group may provide quantum services, such as quantum random number (QRN) generation, quantum key generation, or other suitable services, for the devices within the group to remove processing load or reduce the processing requirements of the devices.

FIG. 1 illustrates an example of a system 101 comprising a first network 102, such as a local network, and a second network 104 remote from the first network and communicating through a communication network 106, such as the Internet. The first network 102 includes QR devices 108A, 108B, 108C segregated into a QR device network group 110, and NQR devices 112A, 112B, 112C segregated into an NQR device network group 114. The QR devices 108A, 108B, 108C may be grouped into security zones, such as a low risk zone 116A, a medium risk zone 116B, and a high risk zone 116C, respectively, and the NQR devices 112A, 112B, 112C may be grouped into security zones, such as a low risk zone 118A, a medium risk zone 118B, and a high risk zone 118C, respectively.

The QR devices 108A, 108B, 108C and the NQR devices 112A, 112B, 112C may be computing devices, such as phones, laptops, computers, wearable devices, smart devices, televisions, Internet-of-Things (IoT) devices, sensors, hardware devices, or another type of computing devices. The QR devices 108A, 108B, 108C and the NQR devices 112A, 112B, 112C may execute various software applications, such as web applications, communication applications, mobile applications, scheduling applications, messaging applications, accounting applications, billing applications, invoice applications, content applications, social media applications, or some other type of applications.

The QR devices 108A, 108B, 108C and the NQR devices 112A, 112B, 112C may communicate via one or more types of communication media, such as at least one of a communication media over a local area network (e.g., a wireless local area network and/or wired local area network, such as utilizing at least one of Ethernet, WiFi, or other technology), a communication media utilizing one or more cellular network technologies (e.g., second-generation cellular technology (2G), third-generation cellular technology (3G), fourth-generation cellular technology (4G), fifth-generation cellular technology (5G) and/or one or more future generation cellular technologies and/or other types of wireless communication media), communication media over a wide area network, cable, optical fiber, radio, or some other communication media.

The QR devices 108A, 108B, 108C may communicate directly with one another within the QR device network group 110. To facilitate communication outside the QR device network group 110, the QR devices 108A, 108B, 108C interface with a QC proxy server 120. The NQR devices 112A, 112B, 112C may communicate directly with one another within the NQR device network group 114. To facilitate communication outside the NQR device network group 114, the NQR devices 112A, 112B, 112C interface with a QC proxy server 122. The QC proxy servers 120, 122 support quantum-resistant protocols for communication, such as PQC or QKD techniques, for communicating data to a target device. In some embodiments, the QC proxy servers 120, 122 interface with a firewall 124 that serves as a boundary of the first network 102. The QC proxy servers 120, 122 isolate the NQR devices 112A, 112B, 112C from the QR devices 108A, 108B, 108C and from remote devices in the second network 104 such that the NQR messages sent by the NQR devices 112A, 112B, 112C are not exposed to quantum capable devices that could readily break the standard NQR encryption techniques, thus compromising the security of the messages.

In some embodiments, the QR device network group 110 includes a quantum service device 126. Although the QR devices 108A, 108B, 108C may be capable of performing quantum functions, such as QRN or quantum key generation, the quantum service device 126 may perform some of the quantum processing to reduce the processing load on the QR devices 108A, 108B, 108C. In some embodiments, the NQR device network group 114 includes a quantum service device 128 that performs quantum services for the NQR devices 112A, 112B, 112C. The QRNs generated by the quantum services devices 126, 128 may be used as seeds for generating encryption keys and/or session tokens. The QRNs generated by the quantum services device 126 are used by the QR devices 108A, 108B, 108C in the QR device network group 110, and the QRNs generated by the quantum services device 128 are used by the NQR devices 112A, 112B, 112C in the NQR device network group 114.

In some embodiments, the recipient of the QRN, such as one of the QR devices 108A, 108B, 108C and/or one of the NQR devices 112A, 112B, 112C, comprises a secure memory for storing the QRN and can generate its own keys based on the QRN. In some embodiments, the recipient of the QRN cannot generate or securely store its own keys, so the quantum service device 126 or the quantum service device 128 generates and stores the QRN and private encryption keys based on the QRN. The quantum service device 126 or the quantum service device 128 then generates and assigns public keys to the communicating devices, such as one of the QR devices 108A, 108B, 108C, one of the NQR devices 112A, 112B, 112C, and/or a remote device in the second network 104. In some embodiments, the quantum service device 126 is integrated with the QC proxy server 120 and/or the quantum service device 128 is integrated with the QC proxy server 122, so the appropriate QC proxy server 120, 122 stores the QRN and private keys and assigns the public keys.

In one example, a consumer router may include the QC proxy servers 120, 122, the quantum service devices 126, 128, and the firewall 124. A user may assign home devices, such as sensors, appliances, laptops, phones, or other devices into the QR device network group 110 or the NQR device network group 114 as appropriate to the capabilities of the device. A graphical user interface may display a map of the local area network 102 as shown in FIG. 1. Initial recommendations for the placement of the devices may be provided by a remote cloud computing resource based on the device identity and the user may make adjustments by dragging the devices into the appropriate network group 112, 114 and risk zone 116A, 116B, 116C, 118A, 118B, 118C.

In another example, a Multi-access edge computing (MEC) may include the QC proxy servers 120, 122, the quantum service devices 126, 128, and the firewall 124. A user may assign devices, such as IoT devices, smart machines, robots, or other devices, into the QR device network group 110 or the NQR device network group 114 as appropriate to the capabilities of the device. A graphical user interface may display a map of the local area network 102 as shown in FIG. 1. Initial recommendations for the placement of the devices may be provided by a remote cloud computing resource based on the device identity and the user may make adjustments by dragging the devices into the appropriate network group 112, 114 and risk zone 116A, 116B, 116C, 118A, 118B, 118C.

Referring to FIGS. 2A-2G, the communication channels used in the first network 102 by the QC proxy servers 120, 122 are illustrated, in accordance with some embodiments. Communications from the QR devices 108A, 108B, 108C in the QR device network group 110 are routed through the QC proxy server 120, and communications from the NQR devices 112A, 112B, 112C in the NQR device network group 114 are routed through the QC proxy server 122.

Figure 2A:
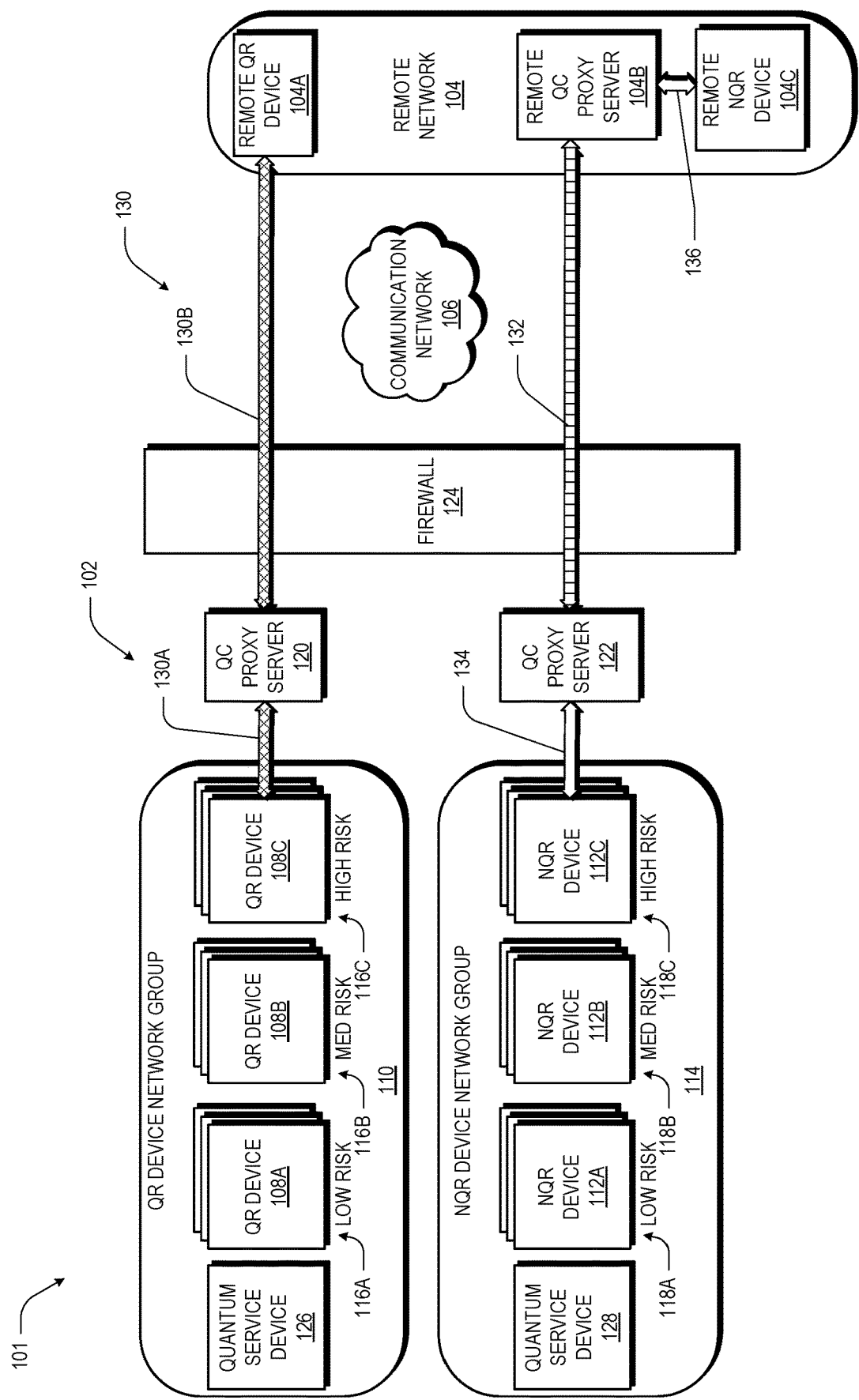
FIGS. 2A-2F are diagrams illustrating the communication channels used in the first network, in accordance with some embodiments.

Referring to FIG. 2A, in an example where one of the QR devices 108A, 108B, 108C, such as the QR device 108C, successfully negotiates with a remote QR device 104A in the second network 104 to use a QR protocol to encrypt the communication channel and the data, a QR channel 130 is established between the QR device 108C and the remote QR device 104A. The QR channel 130 may use PQC, QKD, a combination of PQC and QKD, or some other quantum technology. In some embodiments, the QR channel 130 is established directly between the QR device 108C and the remote QR device 104A, and the QC proxy server 120 forwards the data packets in the QR channel 130. In some embodiments, the QR channel 130 includes a first QR channel segment 130A between the QR device 108C and the QC proxy server 120 and a second QR channel segment 130B between the QC proxy server 120 and the remote QR device 104A, for example, if the QR device 108C has some quantum limitations, such as a lack of QKD support. In some embodiments, the second QR channel segment 130B is between the QC proxy server 120 and a QC proxy server in the second network 104 associated with the remote QR device 104A, for example, if the remote QR device 104A has some quantum limitations. In some embodiments, the first QR channel segment 130A employs PQC and the second QR channel segment 130B uses QKD.

The QC proxy server 122 for the NQR device network group 114 establishes a layered QR channel 132, wrapping around an additional layer of encryption over the channel and data. For example, the NQR device 112C establishes an NQR channel 134 with the QC proxy server 122. In some embodiments, the quantum service device 128 provides a QRN to the NQR device 112C to employ with the NQR encryption, thereby enhancing the level of encryption compared to conventional encryption using a pseudo-random number. The QC proxy server 122 establishes the QR channel 132 with a remote QC proxy server 104B in the second network 104, and the remote QC proxy server 104B establishes an NQR channel 136 with a remote NQR device 104C in the second network 104. The NQR channels 134, 136 employs traditional cryptography to encrypt the data and channel. One or both of the NQR channels 134, 136 may employ a quantum random number. The QR channel 132 may use PQC, QKD, a combination of PQC and QKD, or some other quantum technology. In some cases, the QC proxy server 122 may not be able to negotiate a QR channel, and the QC proxy server 122 then establishes a traditional NQR channel to communicate with the remote NQR device 104C or the remote QC proxy server 104B.

Figure 2B:
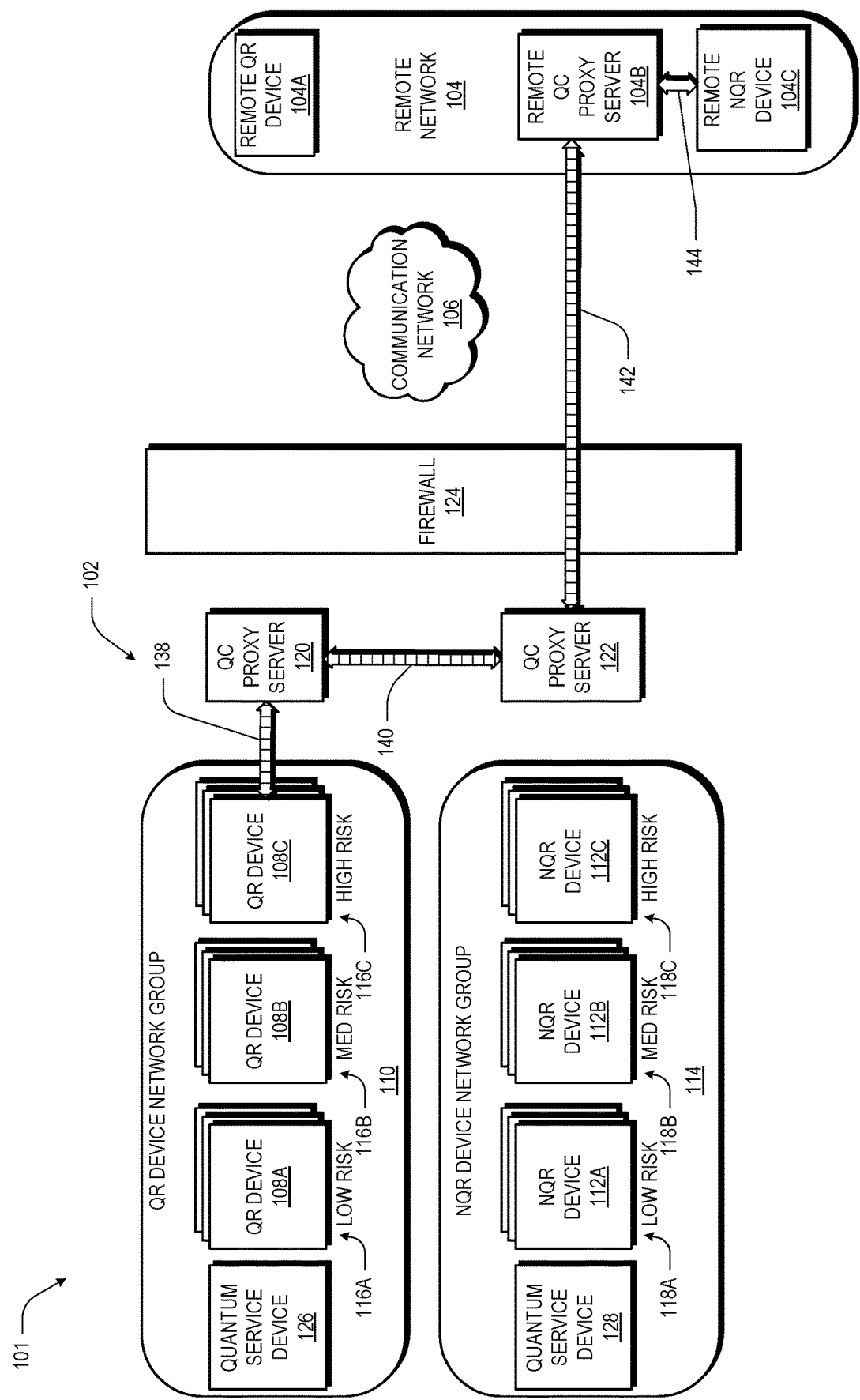

Referring to FIG. 2B, in an example where negotiation between the application or service on the QR device 108C with the other end of the communication channel fails, for example, if the target device of the channel is the remote NQR device 104C or a different QR device that fails to create the QR channel, the QR device 108C may use NQR cryptography to establish a channel for communicating with the remote NQR device 104C. In some embodiments, the QR device 108C establishes a layered QR channel 138 with the QC proxy server 120, the QC proxy server 120 establishes a layered QR channel 140 with the QC proxy server 122, and the QC proxy server 122 establishes a layered QR channel 142 with the remote QC proxy server 1048. The layered QR channels 138, 140, 142 provide an additional QR layer of encryption over the NQR channel negotiated between the QR device 108C and the remote NQR device 104C. The remote QC proxy server 104B may use an NQR channel 144 for communicating with the remote NQR device 104C. The layered QR channels 138, 140, 142 may use PQC, QKD, a combination of PQC and QKD, or some other quantum technology.

Figure 2C:
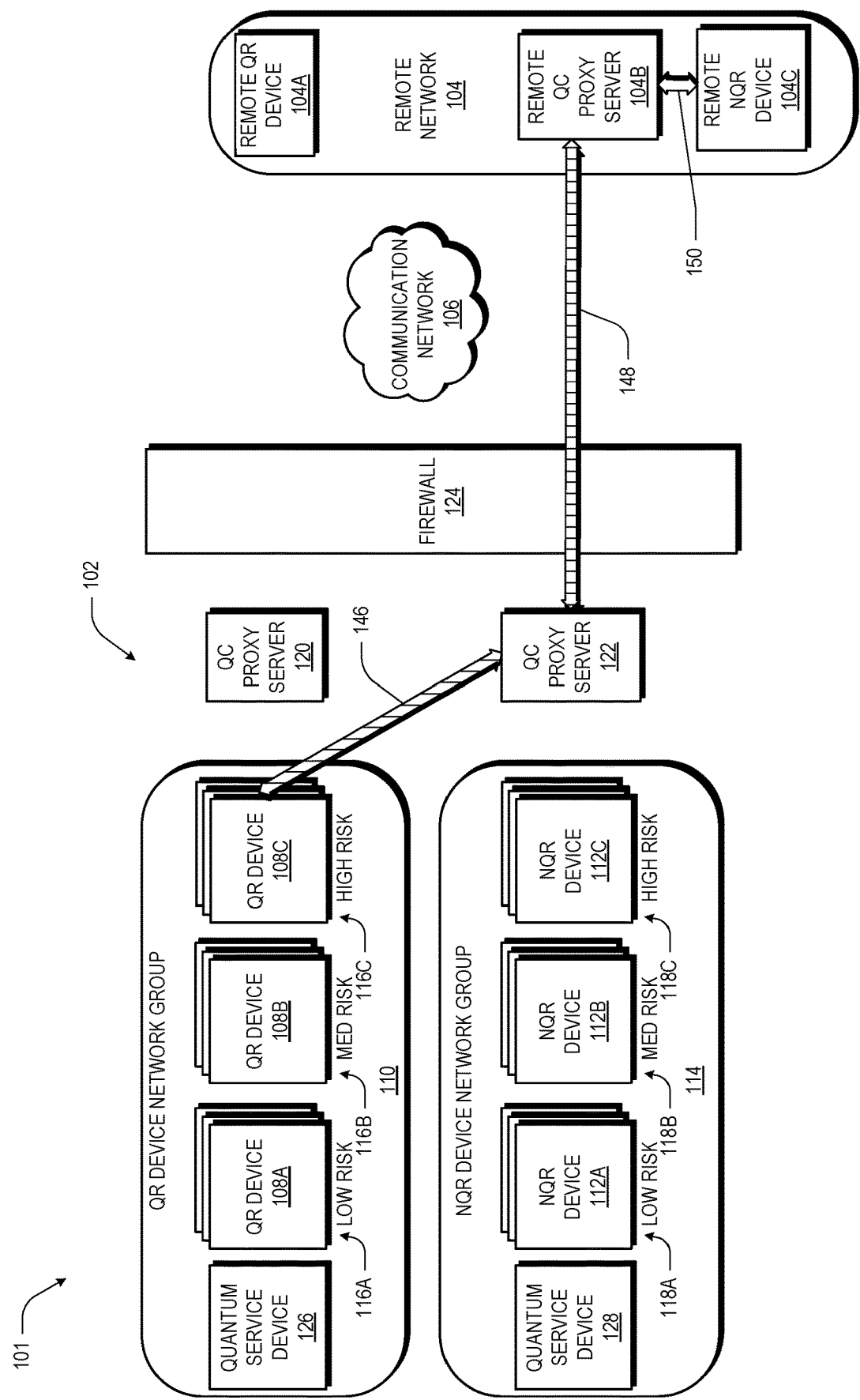

Referring to FIG. 2C, in an example where negotiation between the application or service on the QR device 108C with the other end of the communication channel fails, for example, if the target device of the channel is the remote NQR device 104C or a different QR device that fails to create the QR channel, the QR device 108C may use NQR cryptography to establish a channel for communicating with the remote NQR device 104C. In some embodiments, the QR device 108C bypasses the QC proxy server 120 and establishes a layered QR channel 146 directly with the QC proxy server 122, and the QC proxy server 122 establishes a layered QR channel 148 with the remote QC proxy server 104B. The layered QR channels 146, 148 provide an additional QR layer of encryption over the NQR channel negotiated between the QR device 108C and the remote NQR device 104C. The remote QC proxy server 104B may use an NQR channel 150 for communicating with the remote NQR device 104C. The layered QR channels 146, 148 may use PQC, QKD, a combination of PQC and QKD, or some other quantum technology.

Figure 2D:
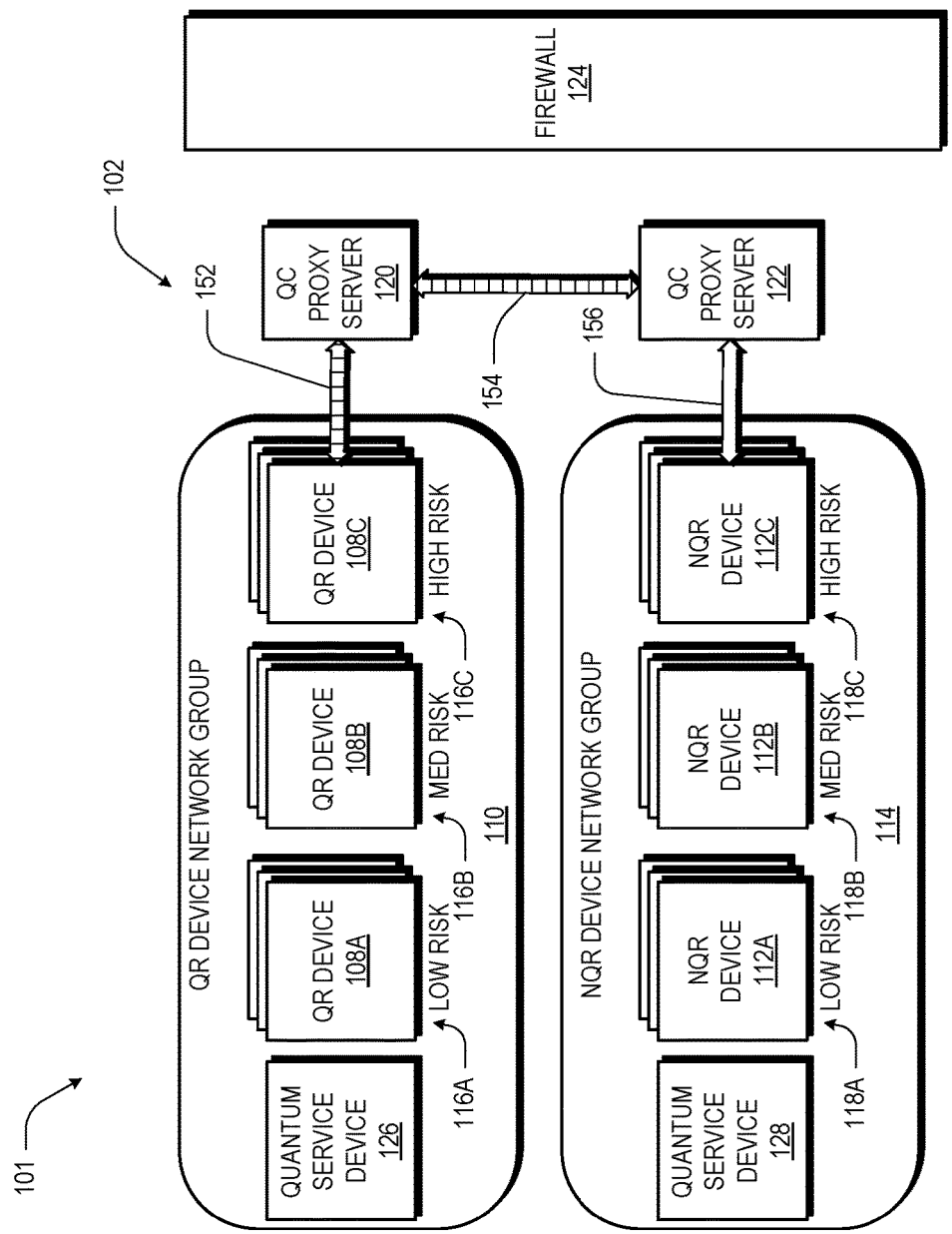

Referring to FIG. 2D, in an example where one of the QR devices 108A, 108B, 108C, such as the QR device 108C, establishes communication with one of the NQR devices 112A, 112B, 112C, such as the NQR device 112C, in the first network 102, the QR device 108C may use NQR cryptography to establish a channel for communicating with the NQR device 112C. In some embodiments, the QR device 108C establishes a layered QR channel 152 with the QC proxy server 120, the QC proxy server 120 establishes a layered QR channel 154 with the QC proxy server 122, and the QC proxy server 122 establishes an NQR channel 156 with the NQR device 112C. In some embodiments, the quantum service device 126 and/or the quantum service device 128 provides a QRN to employ with the NQR encryption, thereby enhancing the level of encryption of the NQR channel 156 compared to conventional encryption using a pseudo-random number. The layered QR channels 152, 154 may use PQC, QKD, a combination of PQC and QKD, or some other quantum technology.

Figure 2E:
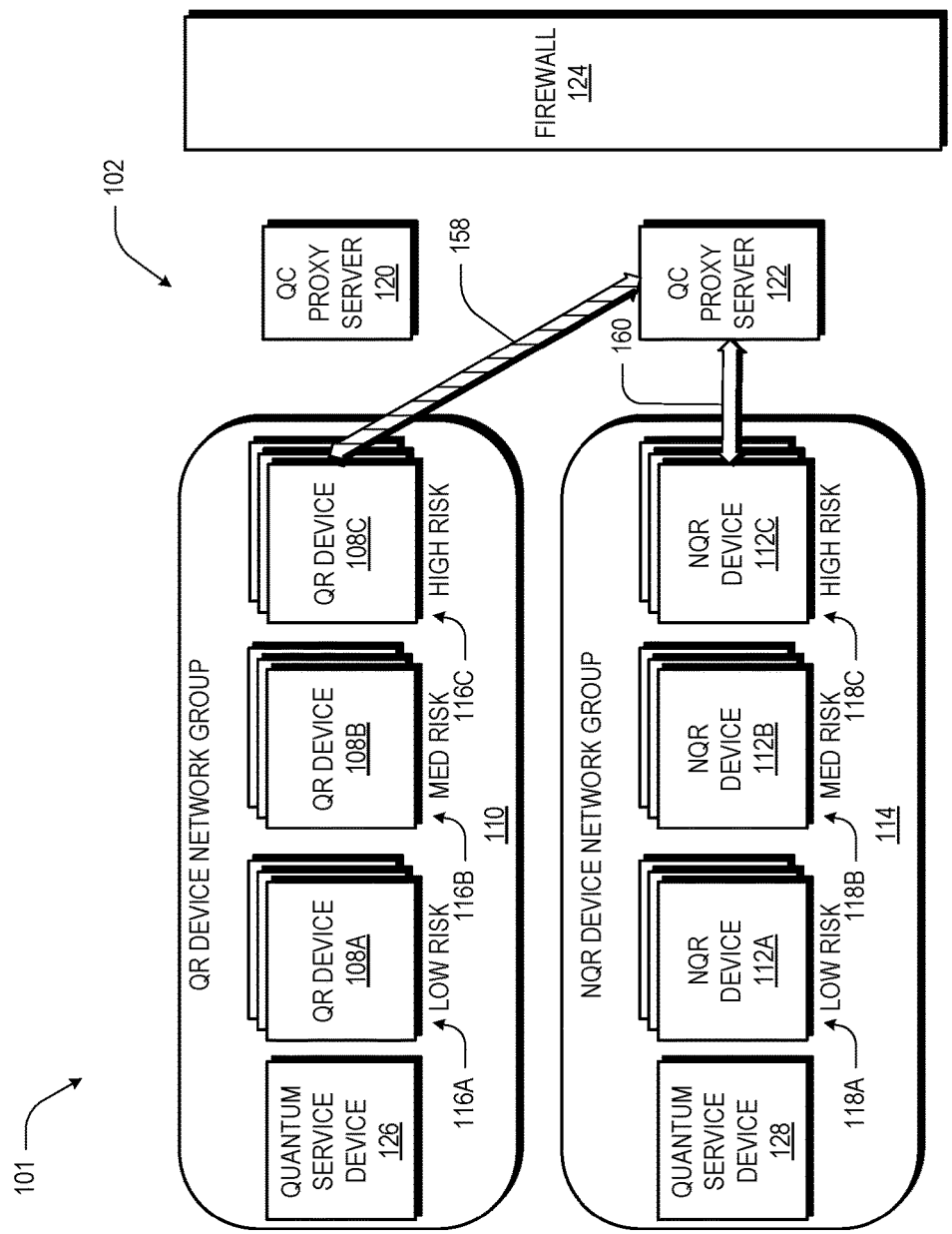

Referring to FIG. 2E, in an example where one of the QR devices 108A, 108B, 108C, such as the QR device 108C, establishes communication with one of the NQR devices 112A, 112B, 112C, such as the NQR device 112C, in the first network 102, the QR device 108C may use NQR cryptography to establish a channel for communicating with the NQR device 112C. In some embodiments, the QR device 108C bypasses the QC proxy server 120 and establishes a layered QR channel 158 directly with the QC proxy server 122, and the QC proxy server 122 establishes an NQR channel 160 with the NQR device 112C. The layered QR channel 158 provides an additional QR layer of encryption over the NQR channel negotiated between the QR device 108C and the NQR device 112C, which may be referred to as a quantum VPN. In some embodiments, the quantum service device 126 and/or the quantum service device 128 provides a QRN to employ with the NQR encryption, thereby enhancing the level of encryption of the NQR channel 160 compared to conventional encryption using a pseudo-random number. The layered QR channel 158 may use PQC, QKD, a combination of PQC and QKD, or some other quantum technology.

Figure 2F:
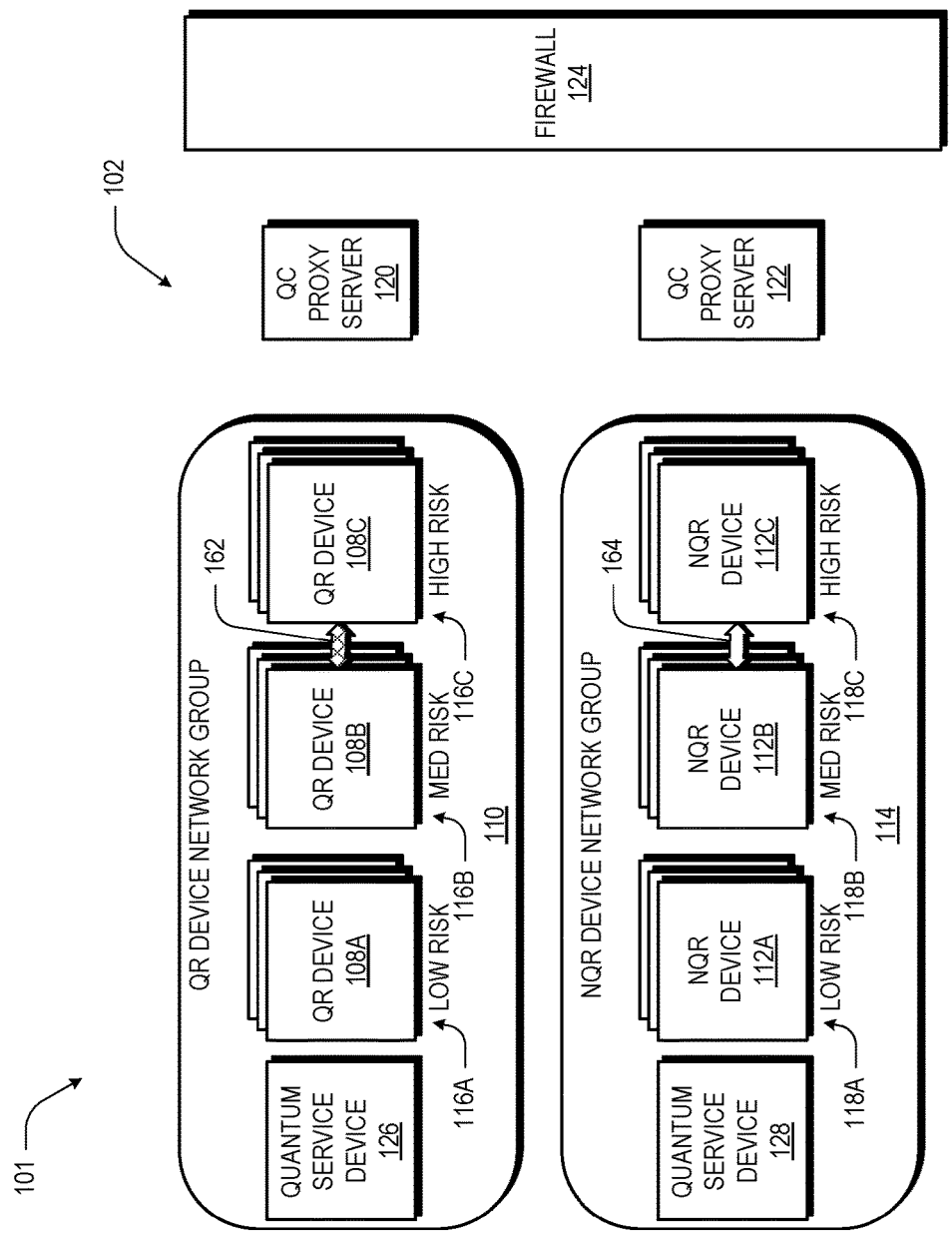

Referring to FIG. 2F, in an example where two of the QR devices 108A, 108B, 108C communicate, such as the QR device 108B and the QR device 108C, a QR channel 162 is established directly between the QR devices 108B, 108C. The QR channel 162 may use PQC, QKD, a combination of PQC and QKD, or some other quantum technology. In an example where two of the NQR devices 112A, 112B, 112C communicate, such as the NQR device 112B and the NQR device 112C, an NQR channel 164 is established directly between the NQR devices 112B, 112C. In some embodiments, the quantum service device 128 provides a QRN to employ with the NQR encryption, thereby enhancing the level of encryption of the NQR channel 164 compared to conventional encryption using a pseudo-random number.

Figure 3:
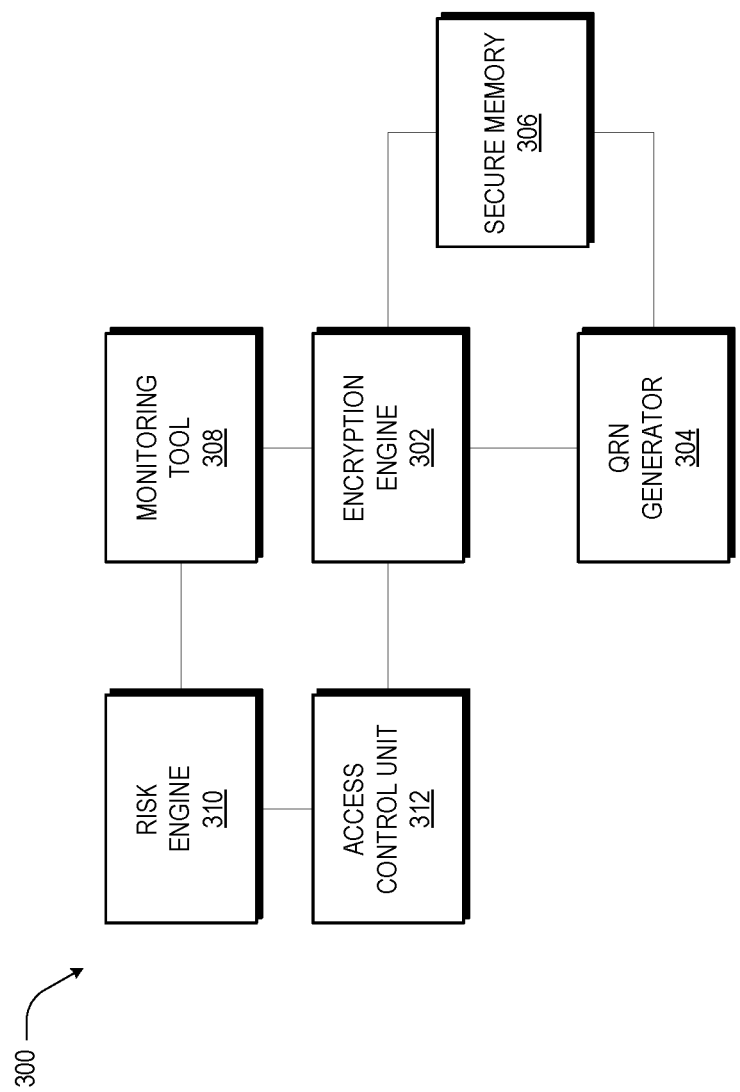
FIG. 3 is a diagram illustrating a quantum service device, in accordance with some embodiments.

Referring to FIG. 3 a diagram of a quantum service device 300, such as the quantum service device 126, 128 shown in FIG. 1 is provided, in accordance with some embodiments. The quantum service device 300 comprises an encryption engine 302, a QRN generator 304, a secure memory 306, a monitoring tool 308, a risk engine 310, and an access control unit 312. In some embodiments, the encryption engine 302 provides encryption services for the devices in the associated network group 110, 114, such as quantum key distribution. The QRN generator 304 generates QRNs for use by the devices in the associated network group 110, 114, for example, to enhance NQR encryption protocols. A QRN provides more robust encryption than a pseudo-random seed. The secure memory 306 stores QRNs or quantum encryption keys for devices in the associated network group 110, 114 that do not have secure memories. In some embodiments, the monitoring tool 308 and the risk engine 310 monitor the activities of the devices in the associated network group 110, 114 and provide input to the access control unit 312 to allow or deny the activities. The monitoring tool 308 identifies the activities, the risk engine 310 classifies the activities using a policies and rules that provide an allow/deny signal to the access control unit 312. The risk engine 310 may use different rules for each of the security zones, where the policies and rules are more restrictive for the high risk zone 116C, 118C, less restrictive for the medium risk zone 116B, 118B, and even less restrictive for the low risk zone 116A, 118A.

In some embodiments, the risk engine 310 uses a 4W1H (what, where, who, when, and how) approach to define the policies and rules. FIG. 4 illustrates an example rule table 400 using the 4W1H approach, in accordance with some embodiments. The "what" parameter defines the acting asset, for example, the device, file, command line interface (CLI), server, etc. The "where" parameter specifies the location of the asset, for example, the network group, subnet, zone, folder in a storage device, general machine. etc. The "who" parameter specifies the acting entity, for example, a user (human), a process, an app on a device, an individual device, etc. The "when" parameter specifies the time that the operation happens. The "how" parameter specifies the operation of the "who" on the "what".

Based on the sensitivity and the desired level of protection, the assets, human user, program/SW agents, operations (actions, activities), and locations, are assigned risk metrics, such as a numeric value or category value (e.g., critical, high, medium, low, info.) Based on these inputs the risk engine 310 determines a final risk score/level for an action on an asset and makes a decision to allow or deny the operation.

Figure 5:
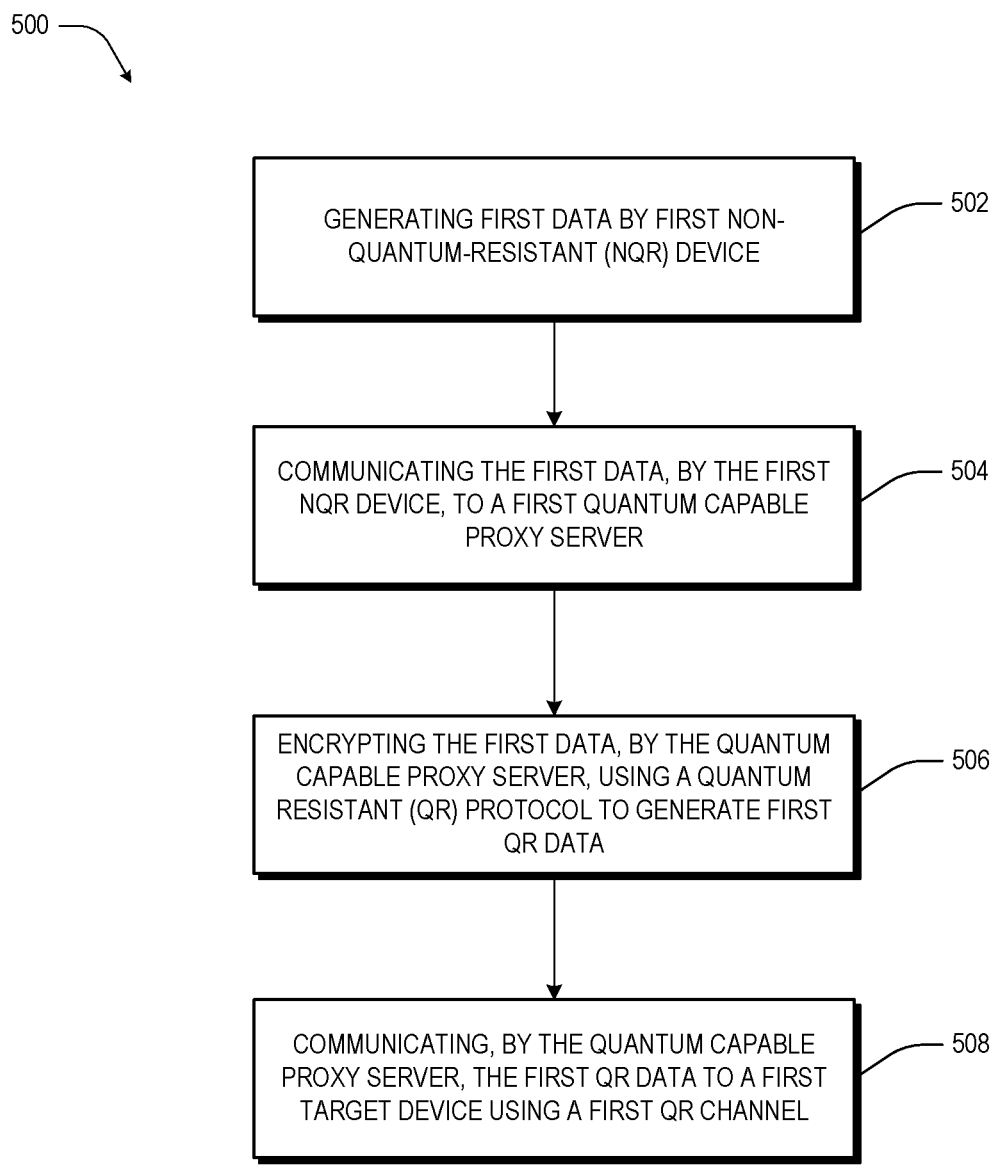
FIG. 5 is a flow chart illustrating an example method for device grouping based on quantum resistant encryption capability, in accordance with some embodiments.

Referring to FIG. 5, a flow chart illustrating an example method 500 for device grouping based on quantum resistant encryption capability is provided, in accordance with some embodiments. At 502, first data is generated by a first non-quantum-resistant (NQR) device 112A, 112B, 112C. At 504, the first data is communicated by the first NQR device 112A, 112B, 112C to a first quantum capable proxy server 122. At 506, the first data is encrypted by the quantum capable proxy server 120 using a quantum resistant (QR) protocol to generate first QR data. At 508 the first QR data is communicated by the quantum capable proxy server 120 to a first target device using a first QR channel.

According to some embodiments, a system is provided. The system includes a first non-quantum-resistant (NQR) device configured to generate first data and a first quantum capable proxy server configured to receive the first data, encrypt the first data using a quantum resistant (QR) protocol to generate first QR data, and communicate the first QR data to a first target device using a first QR channel.

According to some embodiments, the first NQR device and the first quantum capable proxy server are connected to a first network, the first target device comprises a second NQR device connected to a second network separate from the first network, and the second NQR device is connected to a second quantum capable proxy server in the second network.

According to some embodiments, the first QR channel connects the first quantum capable proxy server to the second quantum capable proxy server, the first NQR device is configured to encrypt the first data using a NQR encryption protocol to generate first NQR data, and the first quantum capable proxy server is configured to encrypt the first NQR data to generate the first QR data.

According to some embodiments, the system includes a quantum service device connected to the first network and configured to generate a quantum random number, wherein the NQR encryption protocol employs the quantum random number.

According to some embodiments, the system includes a first quantum-resistant (QR) device configured to generate second data and a second quantum capable proxy server configured to receive the second data and communicate second QR data based on the second data to a second target device using a second QR channel, wherein the first NQR device and the first quantum capable proxy server are part of a first network group in a first network and the first QR device and the second quantum capable proxy server are part of a second network group in the first network separate from the first network group.

According to some embodiments, the second target device comprises a second QR device connected to a second network separate from the first network and the second QR channel directly connects the first QR device to the second QR device.

According to some embodiments, the second target device comprises a second QR device connected to a second network separate from the first network, the second target device is connected to a third quantum capable proxy server in the second network, and the second QR channel connects the second quantum capable proxy server to the third quantum capable proxy server.

According to some embodiments, the system includes a second NQR device connected to the first quantum capable proxy server, a monitoring tool configured to monitor a first action by the first NQR device and a second action by the second NQR device, and a risk engine, wherein the first NQR device is part of a first risk zone having a first risk classification, the second NQR device is part of a second risk zone having a second risk classification different than the first risk classification, and the risk engine is configured to allow or deny the first action based on the first risk classification and to allow or deny the second action based on the second risk classification.

According to some embodiments, a method is provided. The method includes generating first data by a first non-quantum-resistant (NQR) device, communicating the first data, by the first NQR device, to a first quantum capable proxy server, encrypting the first data, by the quantum capable proxy server, using a quantum resistant (QR) protocol to generate first QR data, and communicating, by the quantum capable proxy server, the first QR data to a first target device using a first QR channel.

According to some embodiments, the method includes connecting the first NQR device and the first quantum capable proxy server to a first network, connecting a second NQR device to a second network separate from the first network, and connecting the second NQR device to a second quantum capable proxy server in the second network, wherein the second NQR device comprises the first target device.

According to some embodiments, the method includes connecting the first quantum capable proxy server to the second quantum capable proxy server using the first QR channel, encrypting the first data, by the first NQR device, using a NQR encryption protocol to generate first NQR data, and encrypting the first NQR data, by the first quantum capable proxy server, to generate the first QR data.

According to some embodiments, the method includes generating a quantum random number by a quantum service device in the first network, wherein the NQR encryption protocol employs the quantum random number.

According to some embodiments, the method includes connecting the first NQR device and the first quantum capable proxy server to a first network, generating second data, by a first quantum-resistant (QR) device connected to the first network, generating second QR data based on the second data, and communicating the second QR data, by a second quantum capable proxy server, to a second target device using a second QR channel, wherein the first NQR device and the first quantum capable proxy server are part of a first network group in the first network and the first QR device and the second quantum capable proxy server are part of a second network group in the first network separate from the first network group.

According to some embodiments, the method includes connecting a second QR device to a second network separate from the first network and establishing the second QR channel to directly connect the first QR device to the second QR device, wherein the second target device comprises the second QR device.

According to some embodiments, the method includes connecting a second QR device to a second network separate from the first network, connecting the second target device to a third quantum capable proxy server in the second network, and establishing the second QR channel to connects the second quantum capable proxy server to the third quantum capable proxy server, wherein the second target device comprises the second QR device.

According to some embodiments, the method includes connecting a second NQR device to the first quantum capable proxy server, monitoring a first action by the first NQR device and a second action by the second NQR device, allowing or denying the first action based on a first risk classification, and allowing or denying the second action based on a second risk classification, wherein the first NQR device is part of a first risk zone having the first risk classification, the second NQR device is part of a second risk zone having the second risk classification, and the first risk classification is different than the second risk classification.

According to some embodiments, a non-transitory computer-readable medium is provided. The non-transitory computer-readable medium stores instructions that when executed facilitate performance of operations. The operations include generating first data by a first non-quantum-resistant (NQR) device, communicating the first data, by the first NQR device, to a first quantum capable proxy server, encrypting the first data, by the quantum capable proxy server, using a quantum resistant (QR) protocol to generate first QR data, and communicating, by the quantum capable proxy server, the first QR data to a first target device using a first QR channel.

According to some embodiments, the operations include connecting the first NQR device and the first quantum capable proxy server to a first network, generating second data, by a first quantum-resistant (QR) device connected to the first network, generating second QR data based on the second data, and communicating the second QR data, by a second quantum capable proxy server, to a second target device using a second QR channel, wherein the first NQR device and the first quantum capable proxy server are part of a first network group in the first network, and the first QR device and the second quantum capable proxy server are part of a second network group in the first network separate from the first network group.

According to some embodiments, the operations include connecting the first NQR device and the first quantum capable proxy server to a first network, connecting a second NQR device to a second network separate from the first network, and connecting the second NQR device to a second quantum capable proxy server in the second network, wherein the second NQR device comprises the first target device.

According to some embodiments, the operations include connecting a second NQR device to the first quantum capable proxy server, monitoring a first action by the first NQR device and a second action by the second NQR device, allowing or denying the first action based on a first risk classification, and allowing or denying the second action based on a second risk classification, wherein the first NQR device is part of a first risk zone having the first risk classification, the second NQR device is part of a second risk zone having the second risk classification, and the first risk classification is different than the second risk classification.

Figure 6:
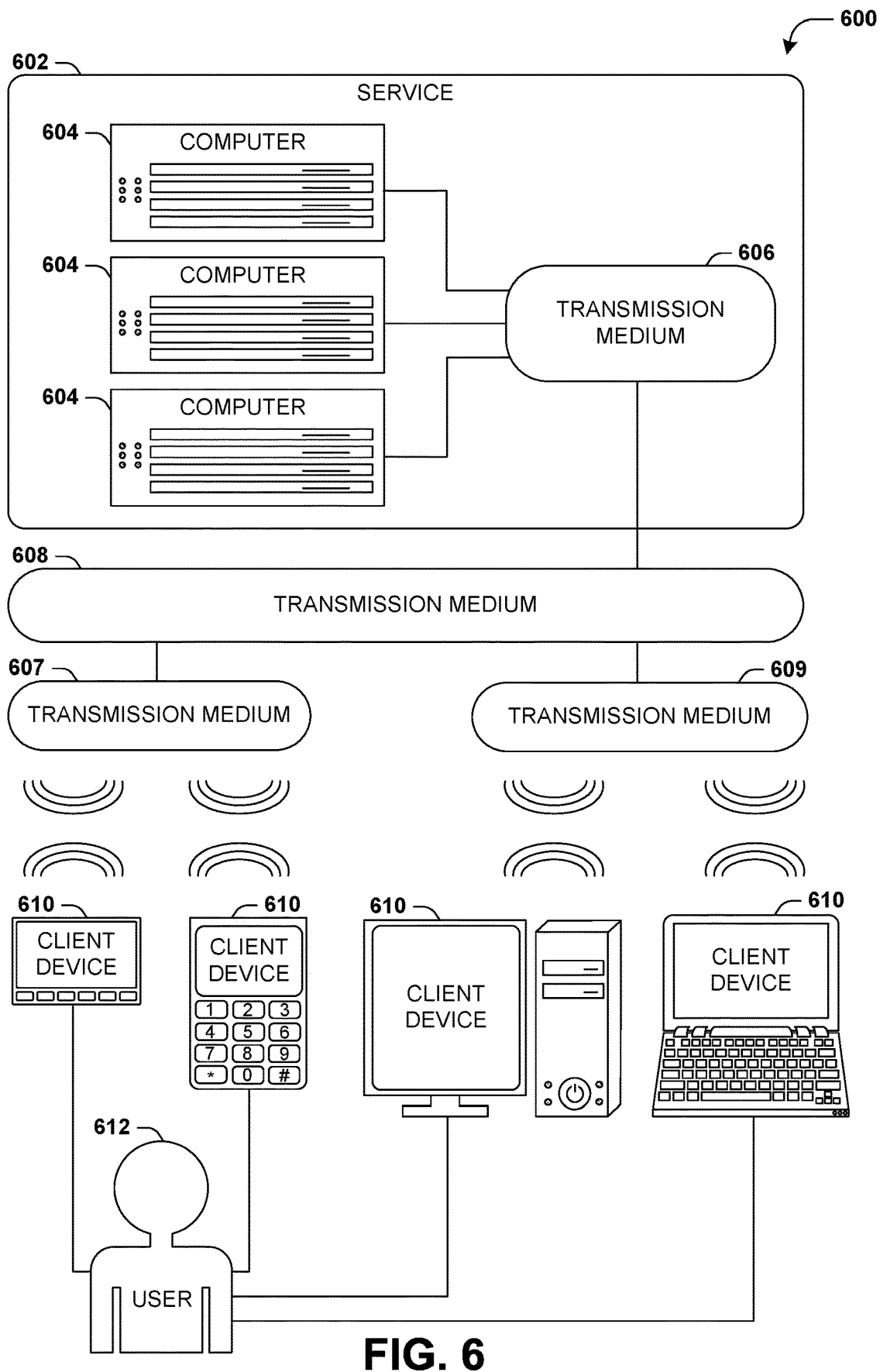
FIG. 6 is an illustration of a scenario involving various examples of transmission mediums that may be used to couple computers and clients for communication.

FIG. 6 is an interaction diagram of a scenario 600 illustrating a service 602 provided by a set of computers 604 to a set of client devices 610 via various types of transmission mediums. The computers 604 and/or client devices 610 may be capable of transmitting, receiving, processing, and/or storing many types of signals, such as in memory as physical memory states.

The computers 604 of the service 602 may be communicatively coupled together, such as for exchange of communications using a transmission medium 606. The transmission medium 606 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 602.

Likewise, the transmission medium 606 may comprise one or more sub-networks, such as may employ different architectures, may be compliant or compatible with differing protocols and/or may interoperate within the transmission medium 606. Additionally, various types of transmission medium 606 may be interconnected (e.g., a router may provide a link between otherwise separate and independent transmission medium 606).

In scenario 600 of FIG. 6, the transmission medium 606 of the service 602 is connected to a transmission medium 608 that allows the service 602 to exchange data with other services 602 and/or client devices 610. The transmission medium 608 may encompass various combinations of devices with varying levels of distribution and exposure, such as a public wide-area network and/or a private network (e.g., a virtual private network (VPN) of a distributed enterprise).

In the scenario 600 of FIG. 6, the service 602 may be accessed via the transmission medium 608 by a user 612 of one or more client devices 610, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 610 may communicate with the service 602 via various communicative couplings to the transmission medium 608. As a first such example, one or more client devices 610 may comprise a cellular communicator and may communicate with the service 602 by connecting to the transmission medium 608 via a transmission medium 607 provided by a cellular provider. As a second such example, one or more client devices 610 may communicate with the service 602 by connecting to the transmission medium 608 via a transmission medium 609 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 604 and the client devices 610 may communicate over various types of transmission mediums. The device grouping techniques described herein may be applied to and transmission medium.

Figure 7:
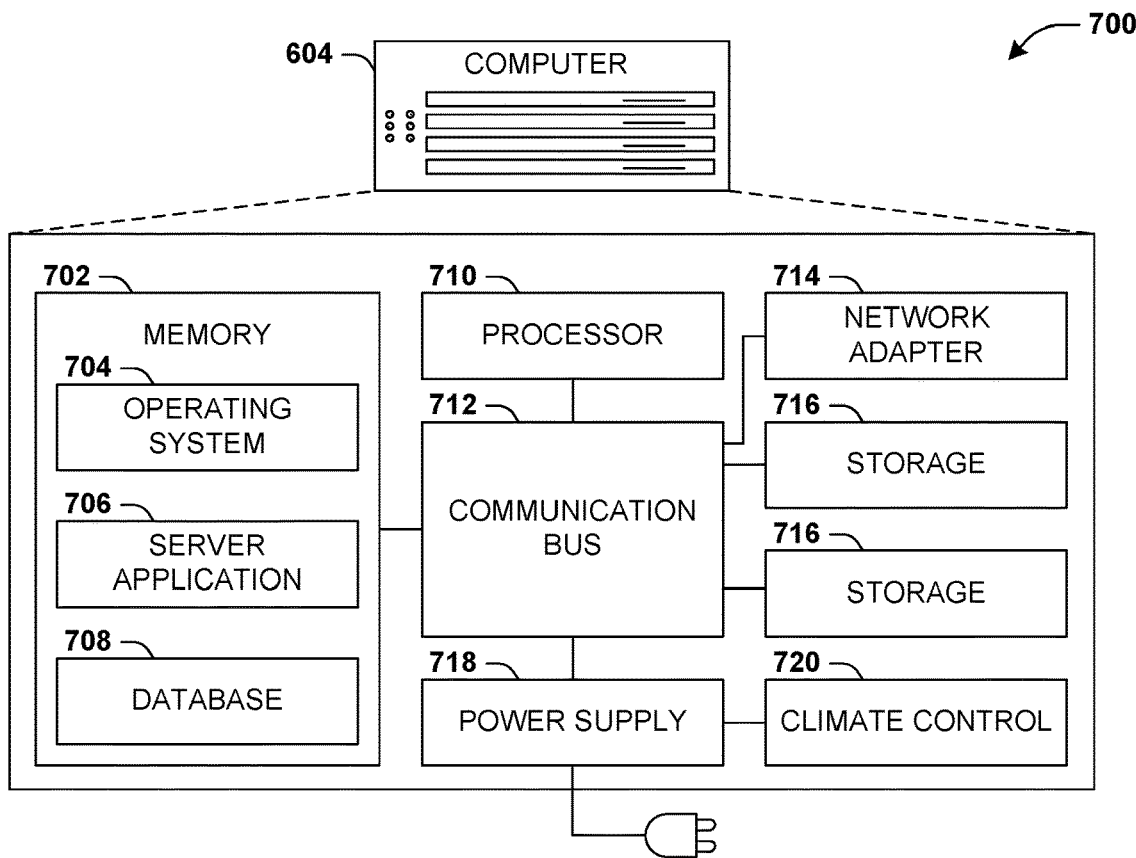
FIG. 7 is an illustration of a scenario involving an example configuration of a computer that may utilize and/or implement at least a portion of the techniques presented herein.

FIG. 7 presents a schematic architecture diagram 700 of a computer 604 that may utilize at least a portion of the techniques provided herein. Such a computer 604 may vary widely in configuration or capabilities, alone or in conjunction with other computers, in order to provide a service such as the service 602.

The computer 604 may comprise one or more processors 710 that process instructions. The one or more processors 710 may optionally include a plurality of cores; one or more coprocessors, such as a mathematics coprocessor or an integrated graphical processing unit (GPU); and/or one or more layers of local cache memory. The computer 604 may comprise memory 702 storing various forms of applications, such as an operating system 704; one or more computer applications 706; and/or various forms of data, such as a database 708 or a file system. The computer 604 may comprise a variety of peripheral components, such as a wired and/or wireless network adapter 714 connectible to a local area network and/or wide area network; one or more storage components 716, such as a hard disk drive, a solid-state storage device (SSD), a flash memory device, and/or a magnetic and/or optical disk reader.

The computer 604 may comprise a mainboard featuring one or more communication buses 712 that interconnect the processor 710, the memory 702, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 712 may interconnect the computer 604 with at least one other computer. Other components that may optionally be included with the computer 604 (though not shown in the schematic architecture diagram 700 of FIG. 7) include a display; a display adapter, such as a graphical processing unit (GPU); input peripherals, such as a keyboard and/or mouse; and a flash memory device that may store a basic input/output system (BIOS) routine that facilitates booting the computer 604 to a state of readiness.

The computer 604 may operate in various physical enclosures, such as a desktop or tower, and/or may be integrated with a display as an "all-in-one" device. The computer 604 may be mounted horizontally and/or in a cabinet or rack, and/or may simply comprise an interconnected set of components. The computer 604 may comprise a dedicated and/or shared power supply 718 that supplies and/or regulates power for the other components. The computer 604 may provide power to and/or receive power from another computer and/or other devices. The computer 604 may comprise a shared and/or dedicated climate control unit 720 that regulates climate properties, such as temperature, humidity, and/or airflow. Many such computers 604 may be configured and/or adapted to utilize at least a portion of the techniques presented herein.

Figure 8:
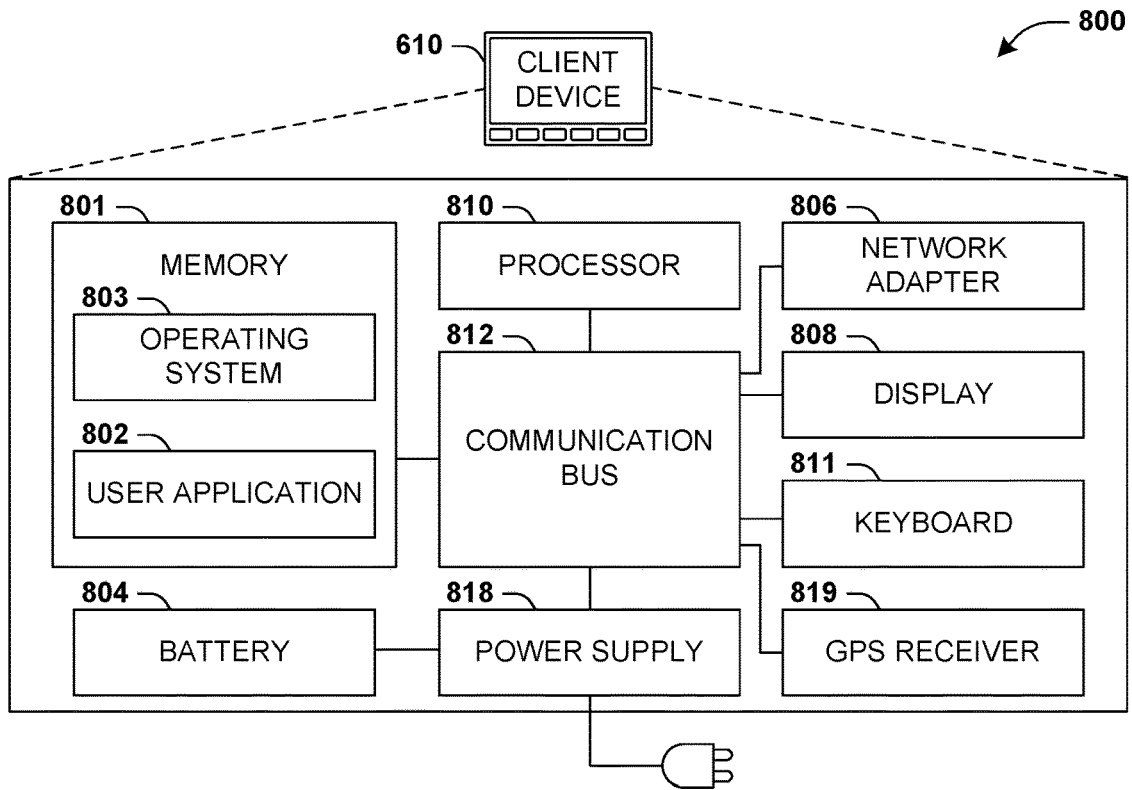
FIG. 8 is an illustration of a scenario involving an example configuration of a client that may utilize and/or implement at least a portion of the techniques presented herein.

FIG. 8 presents a schematic architecture diagram 800 of a client device 610 whereupon at least a portion of the techniques presented herein may be implemented. Such a client device 610 may vary widely in configuration or capabilities, in order to provide a variety of functionality to a user such as the user 612. The client device 610 may be provided in a variety of form factors, such as a desktop or tower workstation; an "all-in-one" device integrated with a display 808; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 610 may serve the user in a variety of roles, such as a workstation, kiosk, media player, gaming device, and/or appliance.

The client device 610 may comprise one or more processors 810 that process instructions. The one or more processors 810 may optionally include a plurality of cores; one or more coprocessors, such as a mathematics coprocessor or an integrated graphical processing unit (GPU); and/or one or more layers of local cache memory. The client device 610 may comprise memory 801 storing various forms of applications, such as an operating system 803; one or more user applications 802, such as document applications, media applications, file and/or data access applications, communication applications such as web browsers and/or email clients, utilities, and/or games; and/or drivers for various peripherals. The client device 610 may comprise a variety of peripheral components, such as a wired and/or wireless network adapter 806 connectible to a local area network and/or wide area network; one or more output components, such as a display 808 coupled with a display adapter (optionally including a graphical processing unit (GPU)), a sound adapter coupled with a speaker, and/or a printer; input devices for receiving input from the user, such as a keyboard 811, a mouse, a microphone, a camera, and/or a touch-sensitive component of the display 808; and/or environmental sensors, such as a global positioning system (GPS) receiver 819 that detects the location, velocity, and/or acceleration of the client device 610, a compass, accelerometer, and/or gyroscope that detects a physical orientation of the client device 610. Other components that may optionally be included with the client device 610 (though not shown in the schematic architecture diagram 800 of FIG. 8) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 610 to a state of readiness; and a climate control unit that regulates climate properties, such as temperature, humidity, and airflow.

The client device 610 may comprise a mainboard featuring one or more communication buses 812 that interconnect the processor 810, the memory 801, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 610 may comprise a dedicated and/or shared power supply 818 that supplies and/or regulates power for other components, and/or a battery 804 that stores power for use while the client device 610 is not connected to a power source via the power supply 818. The client device 610 may provide power to and/or receive power from other client devices.

Figure 9:
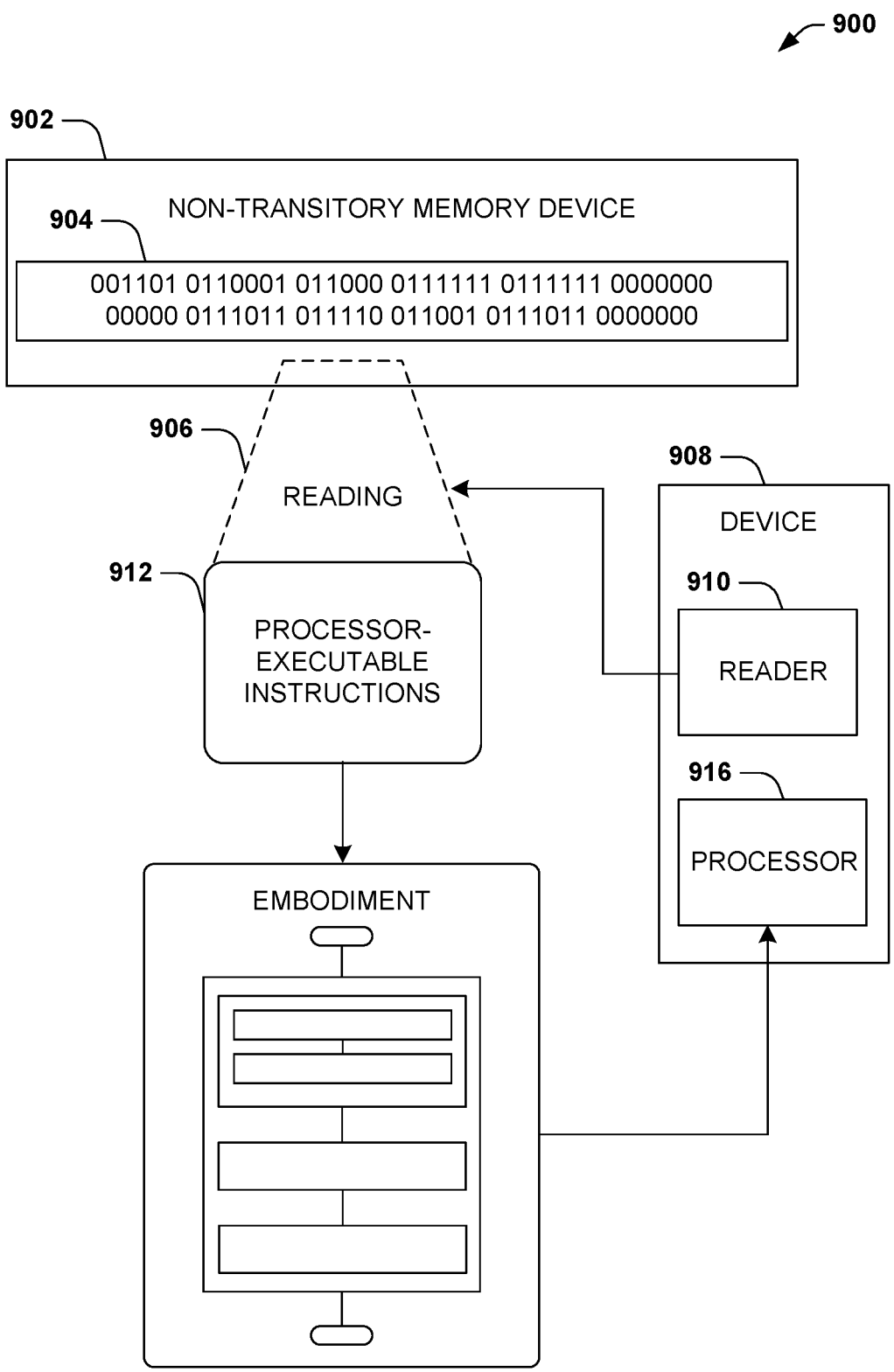
FIG. 9 is an illustration of a scenario featuring an example non-transitory machine readable medium in accordance with one or more of the provisions set forth herein.

FIG. 9 is an illustration of a scenario 900 involving an example non-transitory machine readable medium 902. The non-transitory machine readable medium 902 may comprise processor-executable instructions 912 that when executed by a processor 916 cause performance (e.g., by the processor 916) of at least some of the provisions herein. The non-transitory machine readable medium 902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 902 stores computer-readable data 904 that, when subjected to reading 906 by a reader 910 of a device 908 (e.g., a read head of a hard disk drive, or a read operation invoked on a solid-state storage device), express the processor-executable instructions 912. In some embodiments, the processor-executable instructions 912, when executed cause performance of operations, such as at least some of the example method 500 of FIG. 5, for example. In some embodiments, the processor-executable instructions 912 are configured to cause implementation of a system, such as at least some of the system 101 of FIG. 1, for example.

Figure 10:
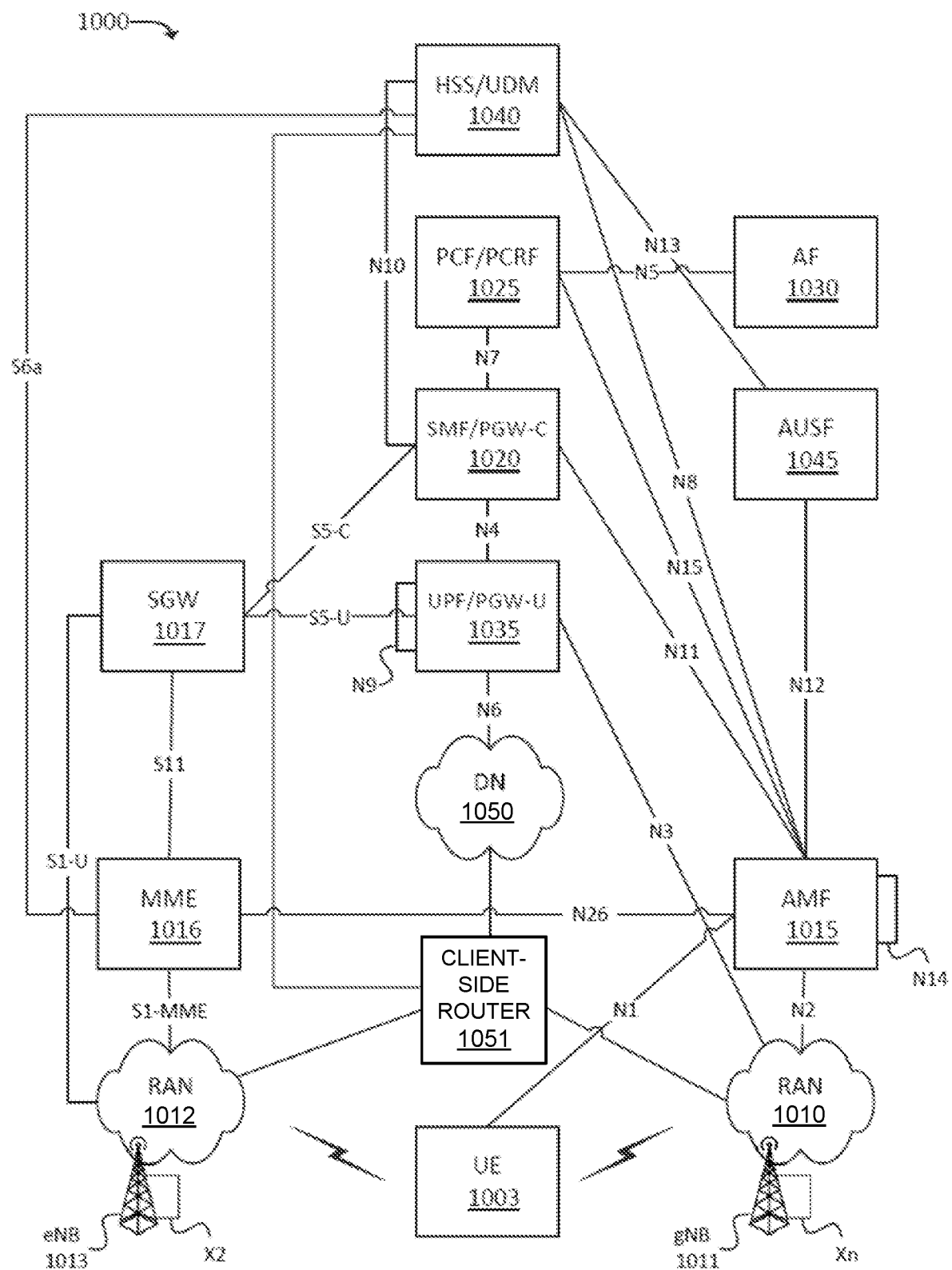
FIG. 10 is an illustration of an example environment in which at least a portion of the techniques presented herein may be utilized and/or implemented.

FIG. 10 illustrates an example environment 1000, in which one or more embodiments may be implemented. In some embodiments, environment 1000 may correspond to a Fifth Generation ("5G") network, and/or may include elements of a 5G network. In some embodiments, environment 1000 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1000 may include UE 1003, RAN 1010 (which may include one or more Next Generation Node Bs ("gNBs") 1011), RAN 1012 (which may include one or more one or more evolved Node Bs ("eNBs") 1013), and various network functions such as Access and Mobility Management Function ("AMF") 1015, Mobility Management Entity ("MME") 1016, Serving Gateway ("SGW") 1017, Session Management Function ("SMF")/Packet Data Network ("PDN") Gateway ("PGW")-Control plane function ("PGW-C") 1020, Policy Control Function ("PCF")/Policy Charging and Rules Function ("PCRF") 1025, Application Function ("AF") 1030, User Plane Function ("UPF")/PGW-User plane function ("PGW-U") 1035, Home Subscriber Server ("HSS")/Unified Data Management ("UDM") 1040, and Authentication Server Function ("AUSF") 1045. Environment 1000 may also include one or more networks, such as Data Network ("DN") 1050. Environment 1000 may include one or more additional devices or systems communicatively coupled to one or more networks (e.g., DN 1050), such as client-side router 1051.

The example shown in FIG. 10 illustrates one instance of each network component or function (e.g., one instance of SMF/PGW-C 1020, PCF/PCRF 1025, UPF/PGW-U 1035, HSS/UDM 1040, and/or 1045). In practice, environment 1000 may include multiple instances of such components or functions. For example, in some embodiments, environment 1000 may include multiple "slices" of a core network, where each slice includes a discrete set of network functions (e.g., one slice may include a first instance of SMF/PGW-C 1020, PCF/PCRF 1025, UPF/PGW-U 1035, HSS/UDM 1040, and/or 1045, while another slice may include a second instance of SMF/PGW-C 1020, PCF/PCRF 1025, UPF/PGW-U 1035, HSS/UDM 1040, and/or 1045). The different slices may provide differentiated levels of service, such as service in accordance with different Quality of Service ("QoS") parameters.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. Alternatively and/or additionally, one or more of the devices of environment 1000 may perform one or more network functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000.

UE 1003 may include a computation and communication device, such as a wireless mobile communication device that is capable of communicating with RAN 1010, RAN 1012, and/or DN 1050. UE 1003 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 1003 may send traffic to and/or receive traffic (e.g., user plane traffic) from DN 1050 via RAN 1010, RAN 1012, and/or UPF/PGW-U 1035.

RAN 1010 may be, or may include, a 5G RAN that includes one or more base stations (e.g., one or more gNBs 1011), via which UE 1003 may communicate with one or more other elements of environment 1000. UE 1003 may communicate with RAN 1010 via an air interface (e.g., as provided by gNB 1011). For instance, RAN 1010 may receive traffic (e.g., voice call traffic, data traffic, messaging traffic, signaling traffic, etc.) from UE 1003 via the air interface, and may communicate the traffic to UPF/PGW-U 1035, and/or one or more other devices or networks. Similarly, RAN 1010 may receive traffic intended for UE 1003 (e.g., from UPF/PGW-U 1035, AMF 1015, and/or one or more other devices or networks) and may communicate the traffic to UE 1003 via the air interface.

RAN 1012 may be, or may include, a LTE RAN that includes one or more base stations (e.g., one or more eNBs 1013), via which UE 1003 may communicate with one or more other elements of environment 1000. UE 1003 may communicate with RAN 1012 via an air interface (e.g., as provided by eNB 1013). For instance, RAN 1010 may receive traffic (e.g., voice call traffic, data traffic, messaging traffic, signaling traffic, etc.) from UE 1003 via the air interface, and may communicate the traffic to UPF/PGW-U 1035, and/or one or more other devices or networks. Similarly, RAN 1010 may receive traffic intended for UE 1003 (e.g., from UPF/PGW-U 1035, SGW 1017, and/or one or more other devices or networks) and may communicate the traffic to UE 1003 via the air interface.

AMF 1015 may include one or more devices, systems, Virtualized Network Functions ("VNFs"), etc., that perform operations to register UE 1003 with the 5G network, to establish bearer channels associated with a session with UE 1003, to hand off UE 1003 from the 5G network to another network, to hand off UE 1003 from the other network to the 5G network, manage mobility of UE 1003 between RANs 1010 and/or gNBs 1011, and/or to perform other operations. In some embodiments, the 5G network may include multiple AMFs 1015, which communicate with each other via the N14 interface (denoted in FIG. 10 by the line marked "N14" originating and terminating at AMF 1015).

MME 1016 may include one or more devices, systems, VNFs, etc., that perform operations to register UE 1003 with the EPC, to establish bearer channels associated with a session with UE 1003, to hand off UE 1003 from the EPC to another network, to hand off UE 1003 from another network to the EPC, manage mobility of UE 1003 between RANs 1012 and/or eNBs 1013, and/or to perform other operations.

SGW 1017 may include one or more devices, systems, VNFs, etc., that aggregate traffic received from one or more eNBs 1013 and send the aggregated traffic to an external network or device via UPF/PGW-U 1035. Additionally, SGW 1017 may aggregate traffic received from one or more UPF/PGW-Us 1035 and may send the aggregated traffic to one or more eNBs 1013. SGW 1017 may operate as an anchor for the user plane during inter-eNB handovers and as an anchor for mobility between different telecommunication networks or RANs (e.g., RANs 1010 and 1012).

SMF/PGW-C 1020 may include one or more devices, systems, VNFs, etc., that gather, process, store, and/or provide information in a manner described herein. SMF/PGW-C 1020 may, for example, facilitate in the establishment of communication sessions on behalf of UE 1003. In some embodiments, the establishment of communications sessions may be performed in accordance with one or more policies provided by PCF/PCRF 1025.

PCF/PCRF 1025 may include one or more devices, systems, VNFs, etc., that aggregate information to and from the 5G network and/or other sources. PCF/PCRF 1025 may receive information regarding policies and/or subscriptions from one or more sources, such as subscriber databases and/or from one or more users (such as, for example, an administrator associated with PCF/PCRF 1025).

AF 1030 may include one or more devices, systems, VNFs, etc., that receive, store, and/or provide information that may be used in determining parameters (e.g., quality of service parameters, charging parameters, or the like) for certain applications.

UPF/PGW-U 1035 may include one or more devices, systems, VNFs, etc., that receive, store, and/or provide data (e.g., user plane data). For example, UPF/PGW-U 1035 may receive user plane data (e.g., voice call traffic, data traffic, etc.), destined for UE 1003, from DN 1050, and may forward the user plane data toward UE 1003 (e.g., via RAN 1010, SMF/PGW-C 1020, and/or one or more other devices). In some embodiments, multiple UPFs 1035 may be deployed (e.g., in different geographical locations), and the delivery of content to UE 1003 may be coordinated via the N9 interface (e.g., as denoted in FIG. 10 by the line marked "N9" originating and terminating at UPF/PGW-U 1035). Similarly, UPF/PGW-U 1035 may receive traffic from UE 1003 (e.g., via RAN 1010, SMF/PGW-C 1020, and/or one or more other devices), and may forward the traffic toward DN 1050. In some embodiments, UPF/PGW-U 1035 may communicate (e.g., via the N4 interface) with SMF/PGW-C 1020, regarding user plane data processed by UPF/PGW-U 1035.

HSS/UDM 1040 and AUSF 1045 may include one or more devices, systems, VNFs, etc., that manage, update, and/or store, in one or more memory devices associated with AUSF 1045 and/or HSS/UDM 1040, profile information associated with a subscriber. AUSF 1045 and/or HSS/UDM 1040 may perform authentication, authorization, and/or accounting operations associated with the subscriber and/or a communication session with UE 1003.

DN 1050 may include one or more wired and/or wireless networks. For example, DN 1050 may include an Internet Protocol ("IP")-based PDN, a wide area network ("WAN") such as the Internet, a private enterprise network, and/or one or more other networks. UE 1003 may communicate, through DN 1050, with data servers, other UEs UE 1003, and/or to other servers or applications that are coupled to DN 1050. DN 1050 may be connected to one or more other networks, such as a public switched telephone network ("PSTN"), a public land mobile network ("PLMN"), and/or another network. DN 1050 may be connected to one or more devices, such as content providers, applications, web servers, and/or other devices, with which UE 1003 may communicate.

The client-side router 1051 may include one or more devices, systems, VNFs, etc., that perform one or more operations described herein. For example, the client-side router 1051 may monitor and/or analyze video stream chunks and/or statuses associated with video stream chunks to check for quality issues and/or may deliver video stream chunks to UE 1003.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A system comprising:
a first non-quantum-resistant (NQR) device configured to generate first data; and
a first quantum capable proxy server configured to:
receive the first data, encrypt the first data using a quantum resistant (QR) protocol to generate first QR data, and communicate the first QR data to a first target device using a first QR channel; and
receive second data from a second NQR device, encrypt the second data using the QR protocol to generate second QR data, and communicate the second QR data using one or more QR channels;
wherein at least one of the first NQR device or the first quantum capable proxy server comprises a hardware processor.

2. The system of claim 1, wherein:
the first NQR device and the first quantum capable proxy server are connected to a first network;
the first target device comprises a third NQR device connected to a second network separate from the first network; and
the third NQR device is connected to a second quantum capable proxy server in the second network.

3. The system of claim 1, comprising:
a first quantum-resistant (QR) device configured to generate third data; and
a second quantum capable proxy server configured to receive the third data and communicate third QR data based on the third data to a second target device using a second QR channel, wherein
the first NQR device and the first quantum capable proxy server are part of a first network group in a first network, and
the first QR device and the second quantum capable proxy server are part of a second network group in the first network separate from the first network group.

4. The system of claim 3, wherein:
the second target device comprises a second QR device connected to a second network separate from the first network; and
the second QR channel directly connects the first QR device to the second QR device.

5. The system of claim 3, wherein:
the second target device comprises a second QR device connected to a second network separate from the first network;
the second target device is connected to a third quantum capable proxy server in the second network; and the second QR channel connects the second quantum capable proxy server to the third quantum capable proxy server.

6. The system of claim 1, comprising:
a monitoring tool configured to monitor a first action by the first NQR device and a second action by the second NQR device; and
a risk engine, wherein:
the first NQR device is part of a first risk zone having a first risk classification;
the second NQR device is part of a second risk zone having a second risk classification different than the first risk classification; and
the risk engine is configured to allow or deny the first action based on the first risk classification and to allow or deny the second action based on the second risk classification.

7. The system of claim 1, wherein the first quantum capable proxy server receives the first data via an NQR channel associated with NQR encryption.

8. A system comprising:
a first non-quantum-resistant (NQR) device configured to generate first data; and
a first quantum capable proxy server configured to receive the first data, encrypt the first data using a quantum resistant (QR) protocol to generate first QR data, and communicate the first QR data to a first target device using a first QR channel,
wherein:
the first NQR device and the first quantum capable proxy server are connected to a first network;
the first target device comprises a second NQR device connected to a second network separate from the first network;
the second NQR device is connected to a second quantum capable proxy server in the second network;
the first QR channel connects the first quantum capable proxy server to the second quantum capable proxy server;
the first NQR device is configured to encrypt the first data using a NQR encryption protocol to generate first NQR data;
the first quantum capable proxy server is configured to encrypt the first NQR data to generate the first QR data; and
at least one of the first NQR device or the first quantum capable proxy server comprises a hardware processor.

9. The system of claim 8, comprising:
a quantum service device connected to the first network and configured to generate a quantum random number; wherein:
the NQR encryption protocol employs the quantum random number.

10. A method, comprising:
generating first data by a first non-quantum-resistant (NQR) device;
communicating the first data, by the first NQR device, to a first quantum capable proxy server;
encrypting the first data, by the first quantum capable proxy server, using a quantum resistant (QR) protocol to generate first QR data;
communicating, by the first quantum capable proxy server, the first QR data to a first target device using a first QR channel;
connecting the first NQR device and the first quantum capable proxy server to a first network;
generating second data, by a first quantum-resistant (QR) device connected to the first network;
generating second QR data based on the second data; and
communicating the second QR data, by a second quantum capable proxy server, to a second target device using a second QR channel, wherein
the first NQR device and the first quantum capable proxy server are part of a first network group in the first network, and
the first QR device and the second quantum capable proxy server are part of a second network group in the first network separate from the first network group.

11. The method of claim 10, comprising:
connecting a second NQR device to a second network separate from the first network; and
connecting the second NQR device to the second quantum capable proxy server in the second network, wherein:
the second NQR device comprises the first target device.

12. The method of claim 11, comprising:
connecting the first quantum capable proxy server to the second quantum capable proxy server using the first QR channel;
encrypting the first data, by the first NQR device, using a NQR encryption protocol to generate first NQR data; and
encrypting the first NQR data, by the first quantum capable proxy server, to generate the first QR data.

13. The method of claim 12, comprising:
generating a quantum random number by a quantum service device in the first network, wherein:
the NQR encryption protocol employs the quantum random number.

14. The method of claim 10, wherein:
connecting a second QR device to a second network separate from the first network; and
establishing the second QR channel to directly connect the first QR device to the second QR device, wherein:
the second target device comprises the second QR device.

15. The method of claim 10, comprising:
connecting a second QR device to a second network separate from the first network;
connecting the second target device to a third quantum capable proxy server in the second network; and
establishing the second QR channel to connect the second quantum capable proxy server to the third quantum capable proxy server, wherein:
the second target device comprises the second QR device.

16. The method of claim 10, comprising:
connecting a second NQR device to the first quantum capable proxy server;
monitoring a first action by the first NQR device and a second action by the second NQR device;
allowing or denying the first action based on a first risk classification; and
allowing or denying the second action based on a second risk classification, wherein:
the first NQR device is part of a first risk zone having the first risk classification;
the second NQR device is part of a second risk zone having the second risk classification; and the first risk classification is different than the second risk classification.

17. A non-transitory computer-readable medium storing instructions that when executed facilitate performance of operations comprising:
generating first data by a first non-quantum-resistant (NQR) device;
communicating the first data, by the first NQR device, to a first quantum capable proxy server;
encrypting the first data, by the first quantum capable proxy server, using a quantum resistant (QR) protocol to generate first QR data;
communicating, by the first quantum capable proxy server, the first QR data to a first target device using a first QR channel;
connecting a second NQR device to the first quantum capable proxy server;
monitoring a first action by the first NQR device and a second action by the second NQR device;
allowing or denying the first action based on a first risk classification; and
allowing or denying the second action based on a second risk classification, wherein:
the first NQR device is part of a first risk zone having the first risk classification;
the second NQR device is part of a second risk zone having the second risk classification; and
the first risk classification is different than the second risk classification.

18. The non-transitory computer-readable medium of claim 17, wherein the operations comprise:
connecting the first NQR device and the first quantum capable proxy server to a first network;
generating second data, by a first quantum-resistant (QR) device connected to the first network;
generating second QR data based on the second data; and
communicating the second QR data, by a second quantum capable proxy server, to a second target device using a second QR channel, wherein
the first NQR device and the first quantum capable proxy server are part of a first network group in the first network, and
the first QR device and the second quantum capable proxy server are part of a second network group in the first network separate from the first network group.

19. The non-transitory computer-readable medium of claim 17, wherein the operations comprise:
connecting the first NQR device and the first quantum capable proxy server to a first network;
connecting a third NQR device to a second network separate from the first network; and
connecting the third NQR device to a second quantum capable proxy server in the second network, wherein:
the third NQR device comprises the first target device.

* * * * *